(12) United States Patent
Takahashi et al.

(10) Patent No.: US 10,207,224 B2
(45) Date of Patent: Feb. 19, 2019

(54) SEAWATER DESALINATION SYSTEM AND ENERGY RECOVERY APPARATUS

(71) Applicant: EBARA CORPORATION, Tokyo (JP)

(72) Inventors: Tamami Takahashi, Tokyo (JP); Masanori Goto, Tokyo (JP); Akira Goto, Tokyo (JP); Motohiko Nohmi, Tokyo (JP); Kazuya Hirata, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 75 days.

(21) Appl. No.: 14/781,474

(22) PCT Filed: Mar. 28, 2014

(86) PCT No.: PCT/JP2014/059315
§ 371 (c)(1),
(2) Date: Sep. 30, 2015

(87) PCT Pub. No.: WO2014/163018
PCT Pub. Date: Oct. 9, 2014

(65) Prior Publication Data
US 2016/0030887 A1    Feb. 4, 2016

(30) Foreign Application Priority Data

Apr. 3, 2013   (JP) ................. 2013-078012

(51) Int. Cl.
*B01D 61/02*     (2006.01)
*B01D 61/06*     (2006.01)
(Continued)

(52) U.S. Cl.
CPC .......... *B01D 61/06* (2013.01); *B01D 61/025* (2013.01); *C02F 1/441* (2013.01); *F15B 21/14* (2013.01);
(Continued)

(58) Field of Classification Search
CPC ...... B01D 61/06; B01D 61/025; B01D 61/10; B01D 2313/08; B01D 2313/246;
(Continued)

(56) References Cited

U.S. PATENT DOCUMENTS 1,661,189 A * 3/1928 Meacham ................ C10G 7/00
208/360
3,545,492 A * 12/1970 Scheid, Jr. ........ F16L 55/02718
138/42

(Continued)

FOREIGN PATENT DOCUMENTS

JP    S49-23805       6/1974
JP    53-124178 A    10/1978
(Continued)

OTHER PUBLICATIONS

Scott, Jeff. "Golf Ball Dimples and Drag", Aerospaceweb.org, Published Feb. 13, 2005. Web. Accessed Apr. 7, 2017.*
International Search Report issued in Patent Application No. PCT/JP2014/059315 dated May 13, 2014.

*Primary Examiner* — Katherine Zalasky
*Assistant Examiner* — Benjamin Lebron
(74) *Attorney, Agent, or Firm* — Pearne & Gordon LLP

(57) ABSTRACT

An energy recovery apparatus which is used in a seawater desalination system includes a cylindrical chamber (CH) being installed such that a longitudinal direction of the chamber is placed in a vertical direction, a concentrated seawater port (P1) for supplying and discharging the concentrated seawater, a seawater port (P2) for supplying and discharging the seawater, a flow resistor (23) provided at a concentrated seawater port (P1) side in the chamber (CH), and a flow resistor (23) provided at a seawater port (P2) side in the chamber (CH). The flow resistor (23) provided at the concentrated seawater port (P1) side and the flow resistor (23) provided at the seawater port (P2) side comprise at least (Continued)

one perforated circular plate, and the perforated circular plate has holes formed at an outer circumferential area outside a predetermined diameter of the circular plate.

6 Claims, 15 Drawing Sheets

(51) Int. Cl.
*C02F 1/44* (2006.01)
*F15B 21/14* (2006.01)
*F15D 1/02* (2006.01)
*G01F 1/42* (2006.01)
*B01D 61/10* (2006.01)
*C02F 103/08* (2006.01)

(52) U.S. Cl.
CPC ............... *F15D 1/025* (2013.01); *G01F 1/42* (2013.01); *B01D 61/10* (2013.01); *B01D 2313/08* (2013.01); *B01D 2313/246* (2013.01); *C02F 2103/08* (2013.01); *C02F 2303/10* (2013.01); *Y02A 20/131* (2018.01); *Y02W 10/30* (2015.05)

(58) Field of Classification Search
CPC .. B01D 2313/18; C02F 1/441; C02F 2103/08; C02F 2303/10; F15B 21/14; F04F 13/00; F15D 1/00; F15D 1/0005; F15D 1/02; F15D 1/08; F16L 55/02718; G01F 1/42; B01F 5/0682; B01F 5/0688; E03C 1/02; E03C 1/08; E03C 1/084; B05B 1/3415; Y02A 20/131; Y02W 10/30
See application file for complete search history.

(56) References Cited

U.S. PATENT DOCUMENTS

| | | | | | |
|---|---|---|---|---|---|
| 3,572,391 | A | * | 3/1971 | Hirsch | .................. F15D 1/0005 138/37 |
| 5,298,226 | A | * | 3/1994 | Nowobilski | ....... B01D 53/0446 422/171 |
| 6,152,182 | A | * | 11/2000 | Grether | ..................... E03C 1/08 138/37 |
| 7,051,765 | B1 | * | 5/2006 | Kelley | ...................... G01F 1/42 138/40 |
| 7,357,337 | B2 | * | 4/2008 | Ferrari | ..................... E03C 1/08 239/428.5 |
| 2002/0100713 | A1 | * | 8/2002 | Strangalies | ............. B03B 4/005 209/474 |
| 2006/0231149 | A1 | * | 10/2006 | Kulkarni | ................... G01F 1/42 138/44 |
| 2008/0302738 | A1 | * | 12/2008 | Glessner | ................. B63B 13/02 210/767 |
| 2011/0089093 | A1 | * | 4/2011 | Myran | ................... B01D 61/06 210/137 |
| 2012/0061309 | A1 | * | 3/2012 | Takahashi | ............ B01D 61/025 210/251 |

FOREIGN PATENT DOCUMENTS

| | | | |
|---|---|---|---|
| JP | WO 2010131765 A1 * | 11/2010 | .......... B01D 61/025 |
| JP | 2011-069329 A | 4/2011 | |
| JP | 2012-096151 A | 5/2012 | |
| JP | 2012-166184 A | 9/2012 | |
| JP | 2012-206019 A | 10/2012 | |
| JP | 2012-232291 A | 11/2012 | |
| WO | 2011/045628 A1 | 4/2011 | |

\* cited by examiner

SEAWATER DESALINATION SYSTEM AND ENERGY RECOVERY APPARATUS

TECHNICAL FIELD

The present invention relates to a seawater desalination system for desalinating seawater by removing salinity from the seawater and an energy recovery apparatus which is preferably used in the seawater desalination system.

BACKGROUND ART

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the osmotic pressure and is desalinated, and fresh water (permeate or desalted water) is taken out from the reverse-osmosis membrane-separation apparatus. The remaining seawater is discharged in a concentrated state of a high salt content as a concentrated seawater (brine) from the reverse-osmosis membrane-separation apparatus. The largest operational cost in the seawater desalination system is energy cost, and it depends heavily on energy for pressurizing the pretreated seawater up to such a pressure to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric expenses as the highest cost in the seawater desalination system are consumed to operate the high-pressure pump for pressurizing the seawater. Therefore, pressure energy possessed by the high-pressure concentrated seawater (reject) with the high salt content which has been discharged from the reverse-osmosis membrane-separation apparatus is utilized for pressurizing part of the seawater. Therefore, as a means for utilizing the pressure energy of the concentrated seawater discharged from the reverse-osmosis membrane-separation apparatus to pressurize part of the seawater, there has been utilized an energy recovery chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 15 is a schematic view showing a configuration example of a conventional seawater desalination system. As shown in FIG. 15, seawater pumped into the seawater desalination system by an intake pump (not shown) is processed to have certain water qualities by a pretreatment system for removing suspended matter or the like, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 10. A seawater supply line 1 for supplying the pretreated seawater having a low pressure is branched at an upstream side of the high-pressure pump 2 and is connected via a valve 7 to a seawater port P2 of the energy recovery chamber 10. The energy recovery chamber 10 has a piston 16 therein, and the piston 16 is arranged to be movable in the energy recovery chamber 10 while separating the interior of the energy recovery chamber 10 into two volume chambers.

The seawater pressurized by utilizing a pressure of the concentrated seawater in the energy recovery chamber 10 is supplied via the valve 7 to a booster pump 8. The control valve 6, the valve 7 and the energy recovery chamber 10 constitute an energy recovery apparatus 11. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4.

FIG. 16 is a schematic view showing a configuration example of the conventional seawater desalination system comprising the two control valves 6, the two energy recovery chambers 10 and the two valves 7 which are the components of the energy recovery apparatus shown in FIG. 15. As shown in FIG. 16, since the energy recovery apparatus 11 has the two energy recovery chambers 10, 10, the energy recovery apparatus 11 is operated such that while the concentrated seawater is supplied to one of the two energy recovery chambers 10, 10, the concentrated seawater is discharged from the other of the energy recovery chambers. Therefore, since the high-pressure seawater can be discharged at all times (continuously) from the apparatus by alternating suction of the low-pressure seawater and discharge of the high-pressure seawater, the flow rate of the seawater supplied to the reverse-osmosis membrane separation apparatus 4 can be kept constant and the fresh water can be obtained at a constant flow rate from the reverse-osmosis membrane separation apparatus 4.

In the above-described conventional energy recovery chamber, the piston in the energy recovery chamber is brought into sliding contact with the inner wall of the chamber, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

Therefore, the applicants of the present invention have proposed an energy recovery chamber having no piston in Japanese-laid open patent publication No. 2012-232291 by employing the system for pressurizing the seawater directly with the concentrated seawater by introducing the seawater and the high-pressure concentrated seawater discharged from the reverse-osmosis membrane (RO membrane) into a cylindrical and elongated chamber, which is used as an energy exchange chamber.

FIG. 17 is a cross-sectional view showing an energy recovery chamber 10 having no piston. As shown in FIG. 17, the energy recovery chamber 10 comprises a long chamber body 11 having a cylindrical shape, and end plates 12 for closing both opening ends of the chamber body 11. A chamber CH is formed in the chamber body 11, and a concentrated seawater port P1 is formed in one of the end plates 12 and a seawater port P2 is formed in the other of the end plates 12. The concentrated seawater port P1 and the seawater port P2 are disposed on the central axis of the cylindrical chamber body 11. The inner diameter of the chamber CH is set to $\phi D$, and the inner diameter of the concentrated seawater port P1 and the seawater port P2 is set to $\phi d$.

The energy recovery chamber 10 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the port P2 for the seawater having small specific gravity is disposed at an upper part of the chamber CH. Specifically, the long chamber body 11 having a cylindrical shape is disposed such that a longitudinal direction (axial direction) of the chamber is placed in a vertical direction. The concentrated seawater port P1 is provided at the lower part of the chamber CH so as to supply and discharge the concentrated seawater at the lower part of the chamber CH, and the seawater port P2 is provided at the upper part of the chamber CH so as to supply and discharge the seawater at the upper part of the chamber CH. The entire length of the chamber CH is L. In the chamber CH, a flow resistor 13 is disposed at a position spaced by a distance L1 in the axial direction from the concentrated seawater port P1, and a flow resistor 13 is disposed at a position spaced by a distance L1 in the axial direction from the seawater port P2. The flow resistor 13 comprises a single perforated plate.

In the energy recovery chamber 10 shown in FIG. 17, a fluid flows in from the respective ports P1, P2 having a small diameter, and the fluid flow having a large velocity distribution at a central part of the chamber is dispersed in a diametrical direction of the chamber CH by the flow resistor 13 and is thus regulated to form a uniform flow in the cross-section of the chamber. Therefore, two fluids are pushed and pulled in such a state that the interface between the seawater and the concentrated seawater is maintained horizontally, and thus the energy transmission is performed while maintaining the state in which the seawater and the concentrated seawater having different salt concentrations are less likely to be mixed in the chamber.

FIG. 18 is a cross-sectional view showing the energy recovery chamber 10 in which two perforated plates spaced by a predetermined distance are disposed near the respective ports as a flow resistor disposed near each port in FIG. 17. As shown in FIG. 18, in the chamber CH, a first perforated plate 14 is provided at a position spaced by a distance L1 in the axial direction from the concentrated seawater port P1, and a second perforated plate 15 is provided at a position spaced by a distance L2 in the axial direction from the first perforated plate 14. Similarly, a first perforated plate 14 is provided at a position spaced by a distance L1 in the axial direction from the seawater port P2, and a second perforated plate 15 is provided at a position spaced by a distance L2 in the axial direction from the first perforated plate 14. The two perforated plates 14 and 15 constitute a flow resistor 13.

Other structural elements of the energy recovery chamber 10 shown in FIG. 18 are the same as those in the energy recovery chamber 10 shown in FIG. 17.

CITATION LIST

Patent Literature

Patent document 1: Japanese laid-open patent publication No. 2012-232291

SUMMARY OF INVENTION

Technical Problem

In the energy recovery chamber 10 shown in FIG. 17, when the fluid flows into the chamber CH from the respective ports P1, P2 having a small diameter, the fluid flow which has a velocity distribution having a high velocity at a central part of the chamber CH is formed, and the fluid flow having a velocity difference in the cross-section of the chamber is dispersed so as to spread across the outer circumference of the chamber by the first perforated plate 14. Further, the fluid flows in the chamber by the interval L2, and then the fluid is dispersed and regulated by the second perforated plate 15 so as to become a uniform flow in the cross-section of the chamber.

Here, a uniform flow of fluid means that velocities and directions of fluid flow are uniform in a certain horizontal cross-section of the chamber. Specifically, the case where flow velocity of fluid (scalar) and flow direction of fluid (vector) in a certain horizontal cross-section of the chamber are identically distributed at any position in the horizontal cross-section is defined as a completely uniform flow of fluid. Specifically, as shown in FIG. 19, flows at arbitrary points Pn, Pm in the horizontal cross-section are shown by arrows representing flow magnitudes which are Vn, Vm, respectively. In this case, when angles ($\alpha$, $\beta$) between the arrows and the auxiliary lines X, Y (X is perpendicular to Y) on the horizontal cross-section are the same ($\alpha_n = \alpha_m$, $\beta_n = \beta_m$), the flows at the points Pn, Pm are defined as a uniform flow. When the angles $\alpha$, $\beta$ are the same at any position in the horizontal cross-section, such flow is defined as a completely uniform flow of fluid. Here, the condition of being closer to this state is defined as a uniform flow. Because a cylindrical chamber wall exists at the outer circumference in the horizontal cross-section as a vertical wall surface, as both the angles $\alpha$, $\beta$ become closer to a right angle, more uniform flow is formed.

When the fluid flows into the chamber CH from the respective ports P1, P2 having a small diameter, the fluid flows through the central part at a high speed and through the outer circumferential part at a low speed in the horizontal cross-section of the chamber in the vicinity of the respective ports P1, P2. Here, to make the dispersion of velocity distribution in the horizontal cross-section small by averaging the fluid flow so that the fluid flows through the central part at a low speed and through the outer circumferential part at a high speed is defined as "an uniformizing action" "for uniformizing the flow". Further, "regulating the flow" means that distribution of flow velocity is changed, and to form a uniform flow as a result of changing the distribution of flow velocity by regulating the flow is defined as "uniformization of flow by regulating the flow".

The pushing and pulling of the seawater and the concentrated seawater means the operation for pushing out (pushing) the seawater from the chamber while pressurizing the seawater with the concentrated seawater, and then drawing in and discharging (pulling) the concentrated seawater with the seawater by switching the valve 6. In FIGS. 17 and 18, a boundary portion of the two fluid where the seawater and the concentrated seawater are brought into contact with each other is formed in the chamber space having a length La between the flow resistors 13, 13. The boundary portion reciprocates in La by pushing and pulling of the seawater and the concentrated seawater, and thus the seawater and the concentrated seawater are controlled so that the seawater is not discharged from the concentrated seawater port P1 and the concentrated seawater is not discharged from the seawater port P2. In the case where the chamber is installed vertically, i.e., is configured such that the concentrated seawater is located at the lower part of the chamber and the seawater is located at the upper part of the chamber, the pushing and pulling of the seawater and the concentrated seawater have the same meaning as the pushing up the seawater and pushing down the concentrated seawater.

The mixing of the seawater and the concentrated seawater at the boundary portion is accelerated by pushing and pulling of the seawater and the concentrated seawater. However, by allowing the flow of the seawater and the concentrated seawater above and below the boundary portion to be a uniform flow in the zone of La in the chamber, the phenomenon in which the boundary surface causes turbulence flow diffusion by non-uniformity of the flow to mix the seawater and the concentrated seawater is suppressed. At the same time, by maintaining the boundary portion horizontally, the pushing and pulling of the seawater and the concentrated seawater can be performed as if there is a hypothetical piston.

In the conventional energy recovery chamber, the fluid which flows into the chamber from the respective ports having a small diameter and has a velocity distribution having a high velocity at a central part of the chamber is dispersed so as to spread toward the outer circumferential direction by the perforated plate disposed in the chamber, and thus flow velocity of fluid and flow direction of fluid in the horizontal cross-section of the chamber at the downstream side of the perforated plate are uniformized.

However, it has been found that when the fluid which flows into the chamber has a high flow velocity, or depending on dimension and shape of the perforated plate or the arrangement position of the perforated plate, i.e., the distance L1 in FIG. 17 or the distances L1, L2 in FIG. 18, the effect of dispersion and regulation of the fluid is not sufficient and non-uniform flow having a high flow velocity still at the central part of the chamber is formed.

FIG. 20 is a view showing the results of flow analysis of the interior of the chamber in the case where the seawater flows into the chamber from the seawater port located in the vicinity of the upper part of the chamber in FIG. 17. Arrows in FIG. 20 are as follows: Flow velocity of fluid is shown by a length of arrow and flow direction of fluid is shown by a direction of arrow.

When the seawater flows into the chamber CH from the port P2 having a small diameter, the seawater in the vicinity of the port of the chamber CH has a velocity distribution having a large velocity at the central part of the chamber. The fluid which has flowed in the chamber and has a high speed at the central part of the chamber flows toward the flow resistor 13 comprising the perforated plate. Depending on the size and pitch of the small holes of the perforated plate, the distance L1 of the perforated plate from the port, and the flow velocity of fluid flowing in through the port, the high-speed flow of fluid passes through the small holes at the central part of the perforated plate as it is. Therefore, non-uniform flow of fluid having a high flow velocity still at the central part of the chamber remains in the evaluation plane A-A at the downstream side of the perforated plate.

Further, FIG. 21 is a view showing the results of flow analysis of the interior of the chamber in the case where the seawater flows into the chamber from the seawater port located in the vicinity of the upper part of the chamber in FIG. 18. Arrows in FIG. 21 are as follows: Flow velocity of fluid is shown by a length of arrow and flow direction of fluid is shown by a direction of arrow.

Even if the two perforated plates are disposed in the chamber CH as shown in FIG. 18, non-uniform flow of fluid having a high flow velocity still at the central part of the chamber remains in the evaluation plane A-A at the downstream side of the perforated plate, depending on the size and pitch of the small holes of the perforated plate, the distances L1, L2 of the perforated plates from the port, and the flow velocity of fluid flowing in through the port.

As shown in FIGS. 20 and 21, when pushing and pulling of the seawater and the concentrated seawater are performed in a state of non-uniform flow in the cross-section of the chamber, mixing of the seawater and the concentrated seawater caused by turbulent flow diffusion in the chamber progresses, and thus the seawater having a high salt content is discharged from the energy recovery apparatus. As a result, the salt content of the seawater supplied to the reverse-osmosis membrane-separation apparatus increases, thus decreasing the amount of fresh water obtained from the reverse-osmosis membrane-separation apparatus, or the pressure of the seawater supplied to the reverse-osmosis membrane-separation apparatus for obtaining the same amount of fresh water increases, thus increasing the energy per unit amount of produced fresh water.

The present invention has been made in view of the above drawbacks. It is therefore an object of the present invention to provide an energy recovery apparatus, having flow resistors disposed respectively at the concentrated seawater port side and the seawater port side of the chamber, which can perform pressure transmission from the high-pressure concentrated seawater to the seawater while suppressing mixing of the two fluids at the boundary portion where the two fluids are brought into contact with each other by the effect for regulating the flow of fluid by the flow resistors to uniformize the flow of fluid even if the high-speed flow of fluid collides with the central part of the flow resistor corresponding to the port diameter, and can prevent the discharge of the seawater having a high salt content which may occur by mixing of the seawater and the concentrated seawater in the energy recovery apparatus.

Solution to Problem

In order to achieve the above object, according to one aspect of the present invention, there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein the flow resistor provided at the concentrated seawater port side and the flow resistor provided at the seawater port side comprise at least one perforated circular plate, and the perforated circular plate has holes formed at an outer circumferential area outside a predetermined diameter of the circular plate.

According to the present invention, the concentrated seawater is supplied to and discharged from the chamber through the concentrated seawater port provided at the lower part of the chamber, and the seawater is supplied to and discharged from the chamber through the seawater port provided at the upper part of the chamber. According to the present invention, the high-speed fluid which has flowed into the chamber collides with the area having no hole located at the central portion of the perforated circular plate which has holes at an outer circumferential area outside a predetermined diameter, and is thus regulated so that the flow of fluid is dispersed in a radial direction of the chamber and slowed down, and then the fluid flows downstream from the area having holes at the outer circumferential area of the perforated circular plate. Therefore, the fluid which flows into the chamber and has a large stream at the central part of the chamber reduces its speed and is dispersed, and thus more uniform flow velocity distribution in the cross-section of the chamber can be formed. The concentrated seawater and the seawater which are regulated by the perforated circular plates form a boundary portion by a difference in specific gravity, and the concentrated seawater at the lower side pushes up the seawater and the seawater at the upper side pushes down the concentrated seawater by pushing and pulling. Thus, while the concentrated seawater and the seawater are separated one above the other and mixing of the concentrated seawater and the seawater at the boundary portion where the two fluids are brought into contact with each other is suppressed, the pressure can be transmitted from the high-pressure concentrated seawater to the seawater.

According to a preferred aspect of the present invention, the perforated circular plate comprises a perforated plate or a mesh plate formed by weaving a wire material which has flow passages, at the outer circumferential area outside the predetermined diameter, for allowing the fluid to pass therethrough.

According to the present invention, the flow resistor comprises at least one perforated plate or mesh plate, and suitable flow resistance is applied to the flow at the upstream side of the perforated plate or the mesh plate in the chamber. Therefore, the flow of fluid can be regulated so that the flow at the downstream side of the perforated plate or the mesh plate becomes uniform over the entirety of the chamber.

According to a preferred aspect of the present invention, the flow resistor comprises a first perforated plate or a first mesh plate having holes formed at the outer circumferential area outside the predetermined diameter, and a second perforated plate or a second mesh plate which is placed more distant from the port than the first perforated plate or the first mesh plate.

According to the present invention, as the flow resistor, the arrangement positions of the first perforated plate (first mesh plate) and the second perforated plate (second mesh plate), the diameter of the small hole, the distance of the small holes (pitch), and the aperture ratio can be adjusted. Therefore, the degree of freedom for regulating the flow increases, and the uniformizing action can be adjusted and enhanced.

According to a preferred aspect of the present invention, the energy recovery apparatus further comprises a doughnut-shaped circular plate having an opening at a center thereof provided between one of the concentrated seawater port and the seawater port or both of the concentrated seawater port and the seawater port, and the flow resistor.

According to the present invention, when the concentrated seawater is supplied to and discharged from the chamber through the concentrated seawater port provided at the lower part of the chamber, and the seawater is supplied to and discharged from the chamber through the seawater port provided at the upper part of the chamber, even if the seawater port and the concentrated seawater port are not located at the chamber axis, the fluid which has flowed in the chamber flows through the hole at the central portion of the circular plate toward the central portion of the flow resistor. Therefore, the flow of fluid is distributed over the entirety of the chamber from the central portion at the upstream side of the flow resistor without the deviated flow, and thus the flow of fluid at the downstream side of the flow resistor can be regulated more uniformly. The concentrated seawater and the seawater which are regulated by the flow resistors form a boundary portion by a difference in specific gravity, and the concentrated seawater at the lower side pushes up the seawater and the seawater at the upper side pushes down the concentrated seawater by pushing and pulling. Thus, while the concentrated seawater and the seawater are separated one above the other and mixing of the concentrated seawater and the seawater at the boundary portion where the two fluids are brought into contact with each other is suppressed, the pressure can be transmitted from the high-pressure concentrated seawater to the seawater.

According to a preferred aspect of the present invention, the first perforated plate or the first mesh plate has a conically-shaped member inside the predetermined diameter, and the conically-shaped member is tapered toward the second perforated plate or the second mesh plate.

According to the second aspect of the present invention, there is provided a seawater desalination system for producing fresh water from seawater by supplying the seawater pressurized by a pump to a reverse-osmosis membrane-separation apparatus to separate the seawater into fresh water and concentrated seawater, the seawater desalination system comprising an energy recovery apparatus according to any one of claims 1 to 5 for converting pressure energy of the concentrated seawater discharged from the reverse-osmosis membrane-separation apparatus to pressure energy of the seawater.

According to the present invention, the pressure energy of the high-pressure concentrated seawater discharged from the reverse-osmosis membrane-separation apparatus can be directly transmitted to the seawater, and mixing of the two fluids when the concentrated seawater and the seawater are pushed and pulled can be suppressed. Therefore, the seawater having a high salt content is not discharged from the energy recovery apparatus, and thus the system can be operated without raising supply pressure of the seawater to the reverse-osmosis membrane-separation apparatus. Accordingly, the electric power required for operating the system can be reduced.

Advantageous Effects of Invention

According to the present invention, the following effects can be achieved.

1) The high-speed fluid which has flowed into the chamber is distributed in a radial direction of the chamber and slowed down at the area having no hole at the central part of the perforated circular plate which has holes at an outer circumferential area outside a predetermined diameter, and then the fluid flows downstream from the area having the holes at the outer circumferential area of the perforated circular plate. Therefore, the fluid which flows into the chamber and has a large stream reduces its speed and is dispersed, and thus more uniform flow in the cross-section of the chamber can be formed. By the uniformizing action for regulating the flow of fluid by the flow resistor comprising the perforated circular plate, while mixing of the concentrated seawater and the seawater at the boundary portion where the two fluids are brought into contact with each other is suppressed, the pressure can be transmitted from the high-pressure concentrated seawater to the seawater.

2) Because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide its sufficient performance and the replacement cycle of the reverse-osmosis membrane itself can be prolonged.

Figure 6:
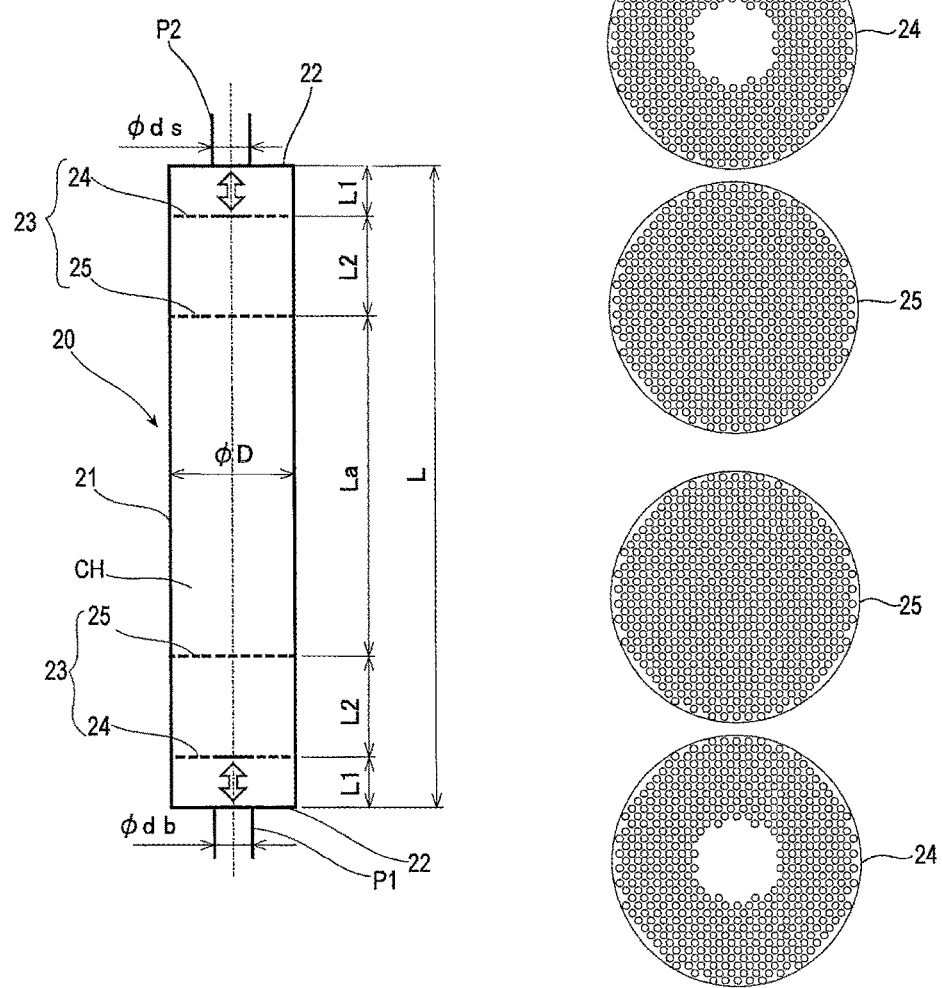
Figure 7:
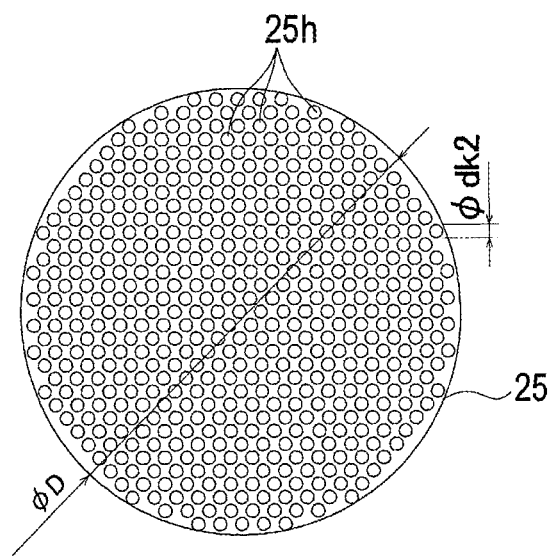
Figure 8:
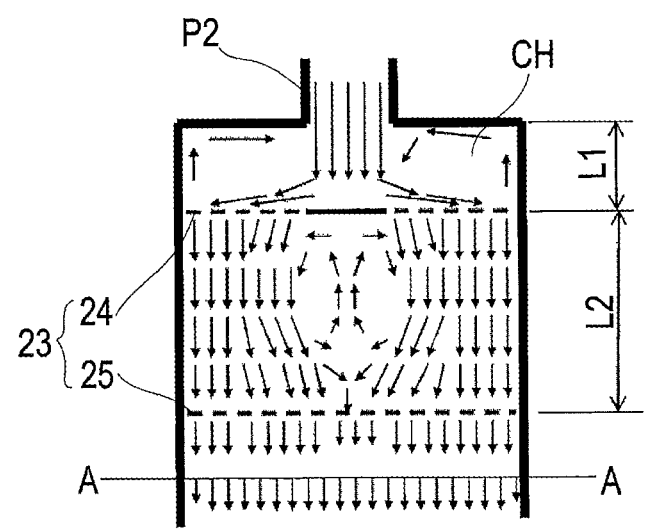
Figure 9:
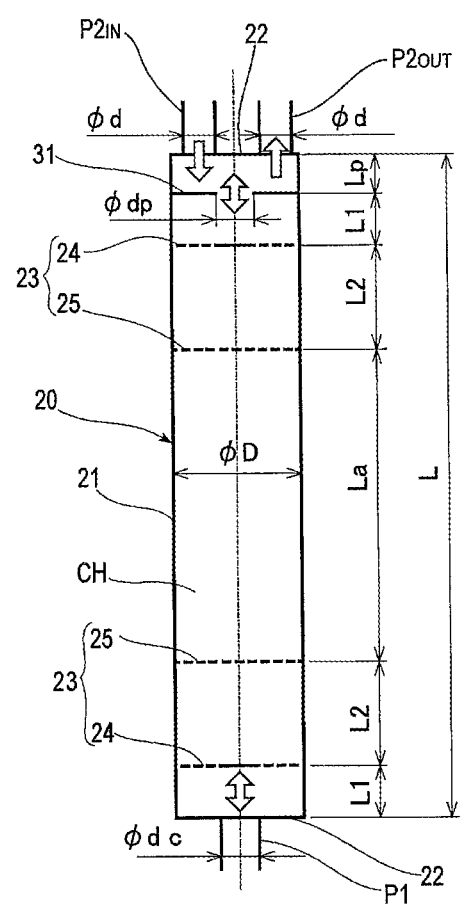
Figure 10:
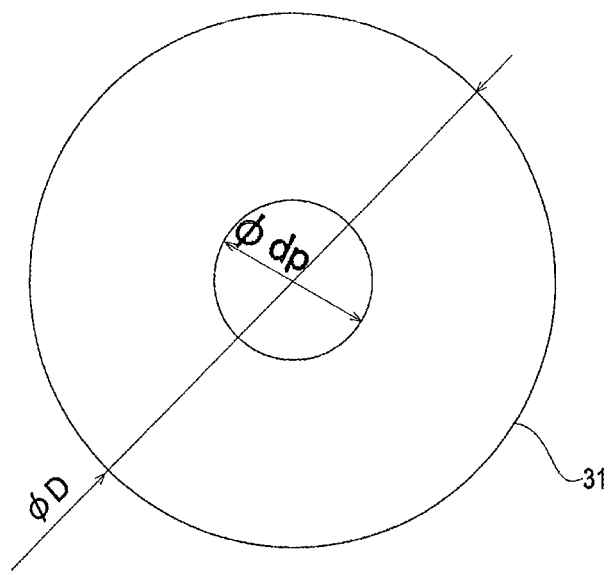
Figure 11:
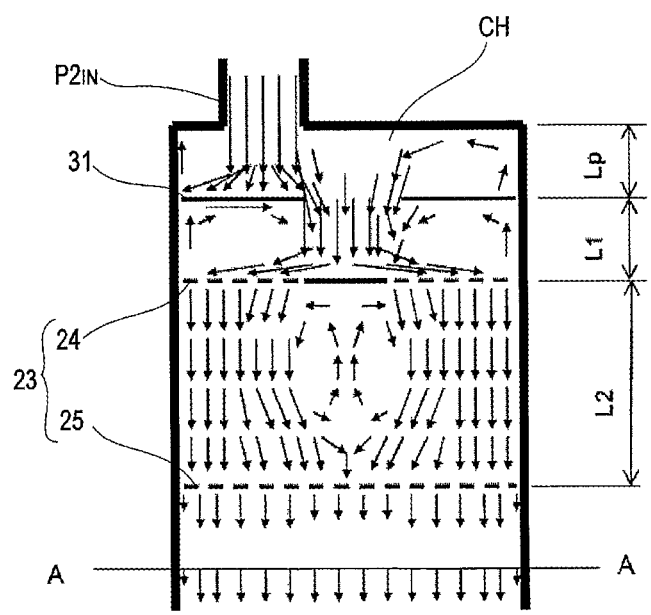
Figure 12:
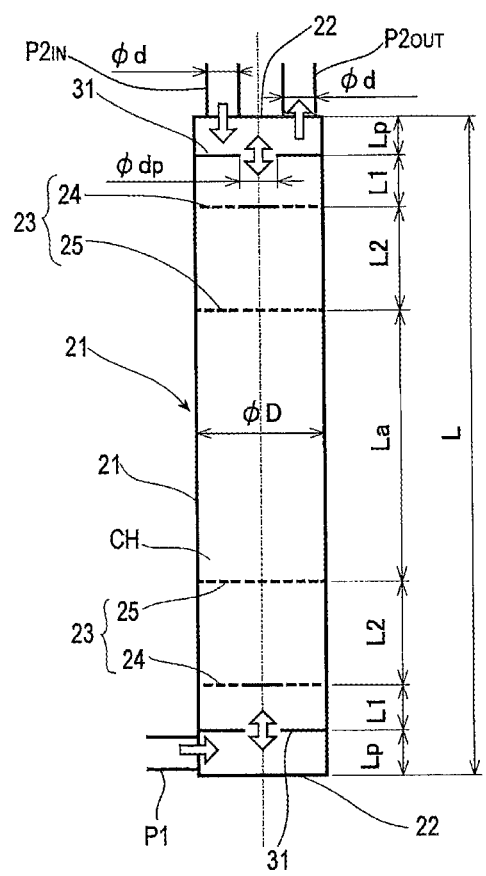
Figure 13:
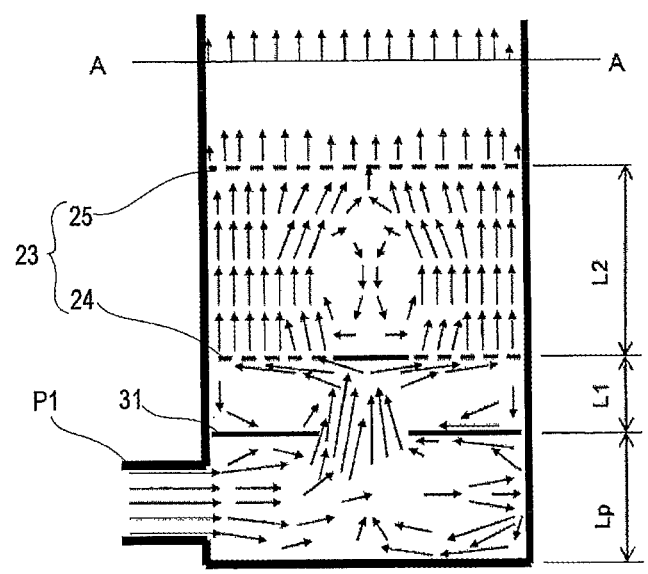
Figure 14:
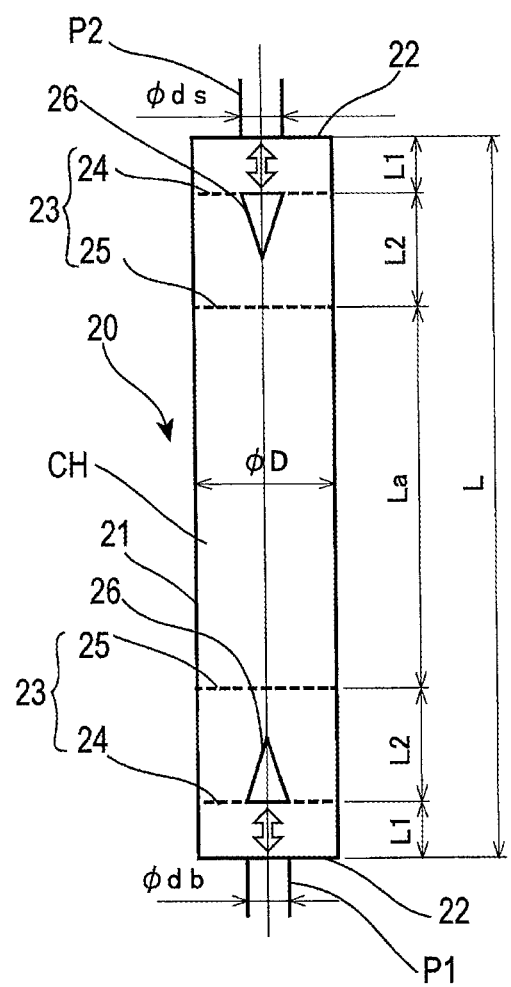
Figure 15:
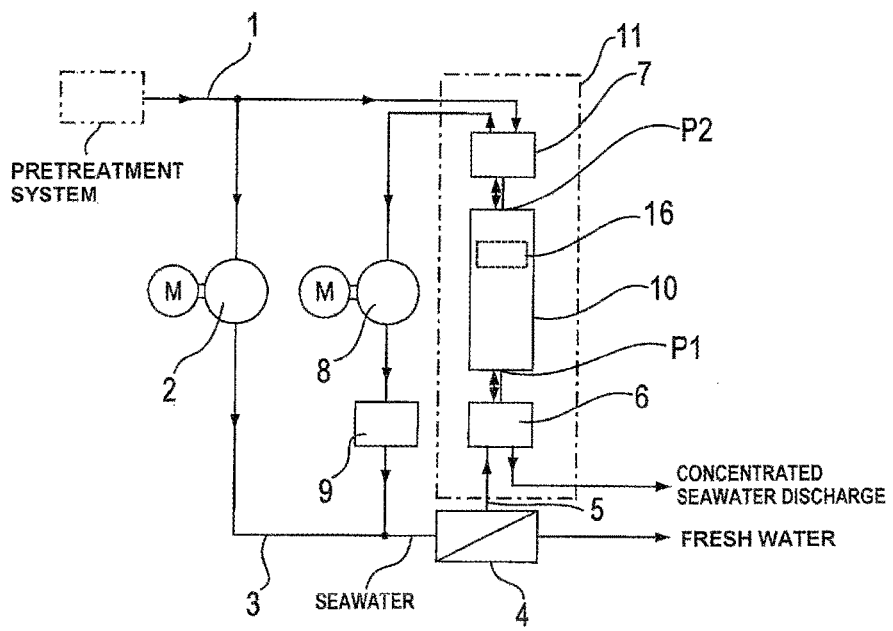
Figure 16:
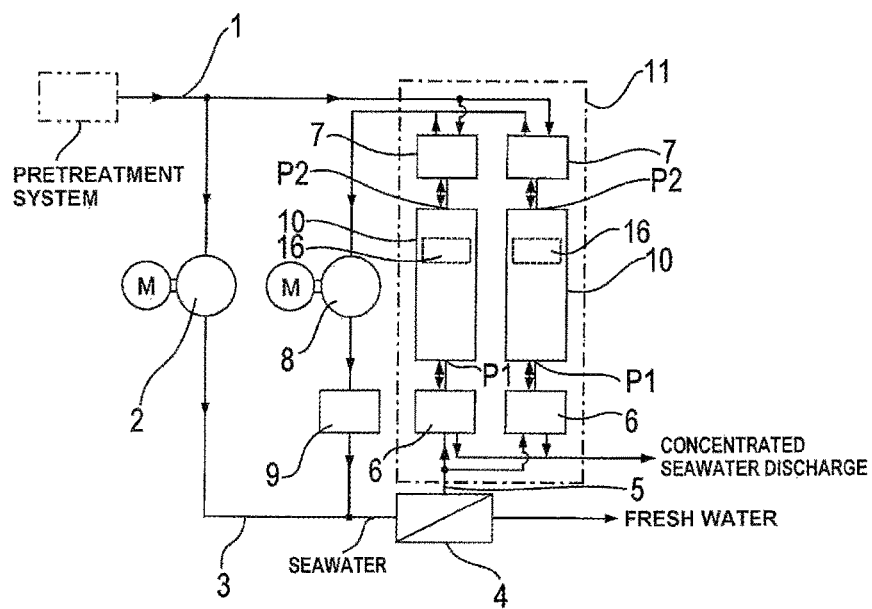
Figure 17:
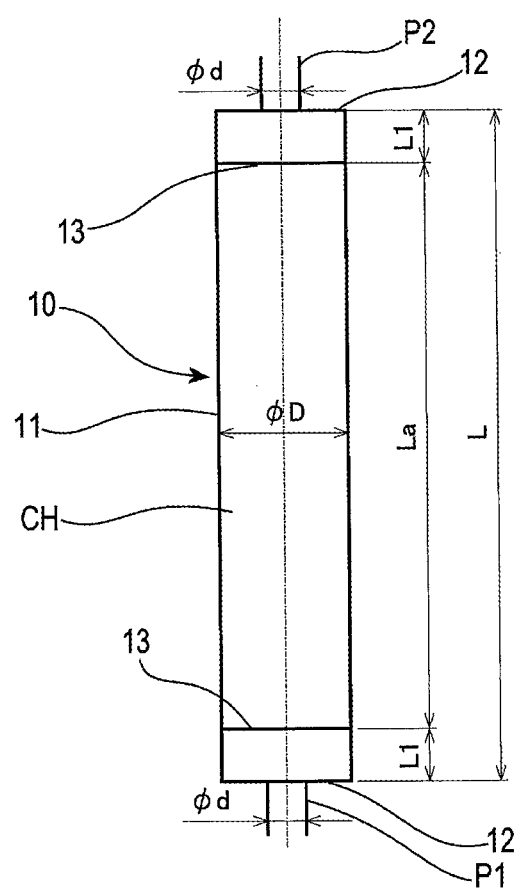

The left-hand view of FIG. 6 is a schematic cross-sectional view showing an energy recovery chamber of the energy recovery apparatus according to another embodiment of the present invention, and the right-hand view of FIG. 6 is a plan view showing the perforated plates installed in the energy recovery chamber;

FIG. 7 is an enlarged plan view of the second perforated plate shown at the right side of FIG. 6;

FIG. 8 is a view showing the results of flow analysis of the interior of the chamber in the case where the seawater flows into the chamber from the seawater port located in the vicinity of the upper part of the chamber in FIG. 6;

FIG. 9 is a cross-sectional view showing a chamber of the energy recovery apparatus according to still another embodiment of the present invention;

FIG. 10 is a plan view of the holed circular plate;

FIG. 11 is a view showing the results of flow analysis in the vicinity of the seawater port in the chamber in the case where the seawater flows in from the seawater port provided at the position spaced radially from the central axis of the chamber as shown in FIG. 9;

FIG. 12 is a cross-sectional view of the chamber in the energy recovery apparatus according to still another embodiment of the present invention;

FIG. 13 is a view showing the results of flow analysis in the vicinity of the concentrated seawater port in the chamber in the case where the concentrated seawater port is provided at the side surface of the chamber as shown in FIG. 12;

FIG. 14 is a schematic cross-sectional view showing an energy recovery chamber of the energy recovery apparatus according to another embodiment of the present invention;

FIG. 15 is a schematic view showing a configuration example of a conventional seawater desalination system;

FIG. 16 is a schematic view showing a configuration example of the conventional seawater desalination system comprising the two control valves, the two energy recovery chambers and the two valves which are the components of the energy recovery apparatus shown in FIG. 15;

FIG. 17 is a cross-sectional view showing an energy recovery chamber having no piston.

Figure 18:
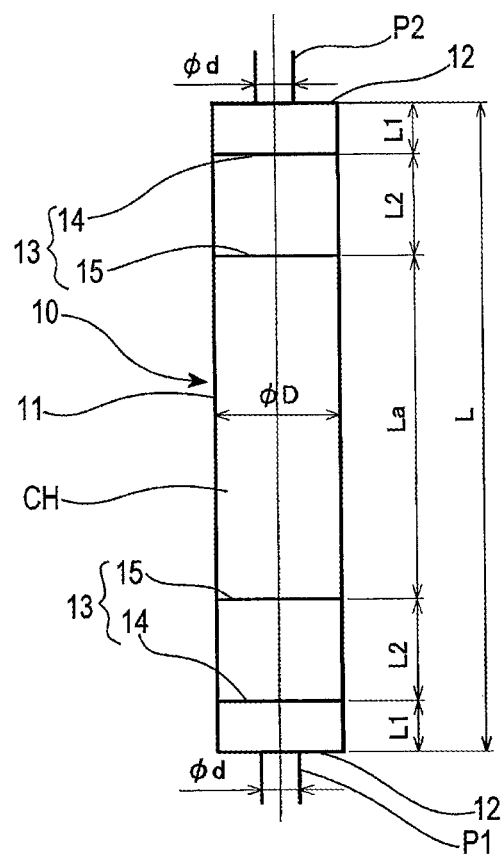
Figure 19:
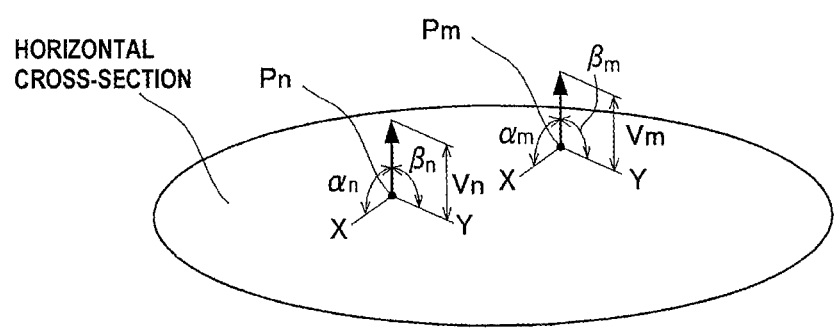

FIG. 18 is a cross-sectional view showing the energy recovery chamber in which two perforated plates spaced by a predetermined distance are disposed near the respective ports as a flow resistor in FIG. 17;

FIG. 19 is a view showing the uniformity of flows at any points Pn, Pm in the horizontal cross-section in the chamber.

Figure 20:
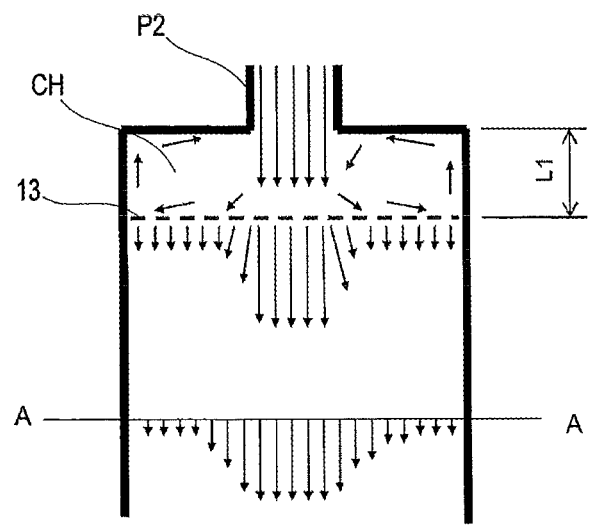
Figure 21:
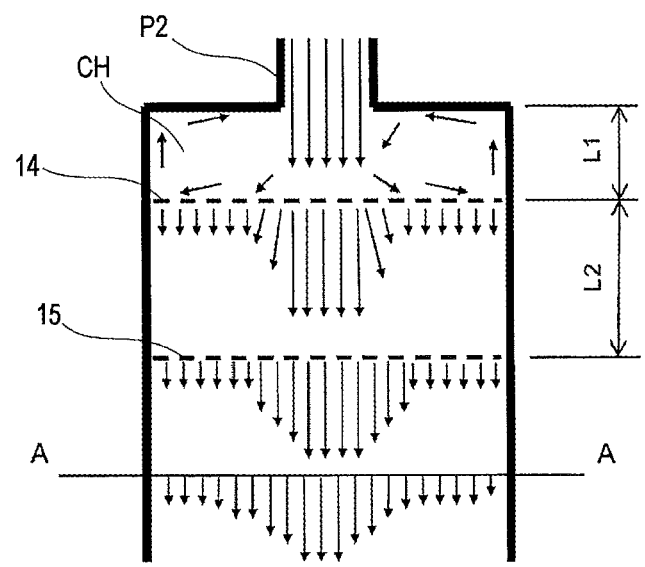

FIG. 20 is a view showing the results of flow analysis of the interior of the chamber in the case where the seawater flows into the chamber from the seawater port located in the vicinity of the upper part of the chamber in FIG. 17; and FIG. 21 is a view showing the results of flow analysis of the interior of the chamber in the case where the seawater flows into the chamber from the seawater port located in the vicinity of the upper part of the chamber in FIG. 18.

DESCRIPTION OF EMBODIMENTS

An energy recovery apparatus according to preferred embodiments of the present invention will be described below with reference to FIGS. 1 through 14. Identical or corresponding parts are denoted by identical reference numerals in FIGS. 1 through 14 and will not be described in duplication.

Figure 1:
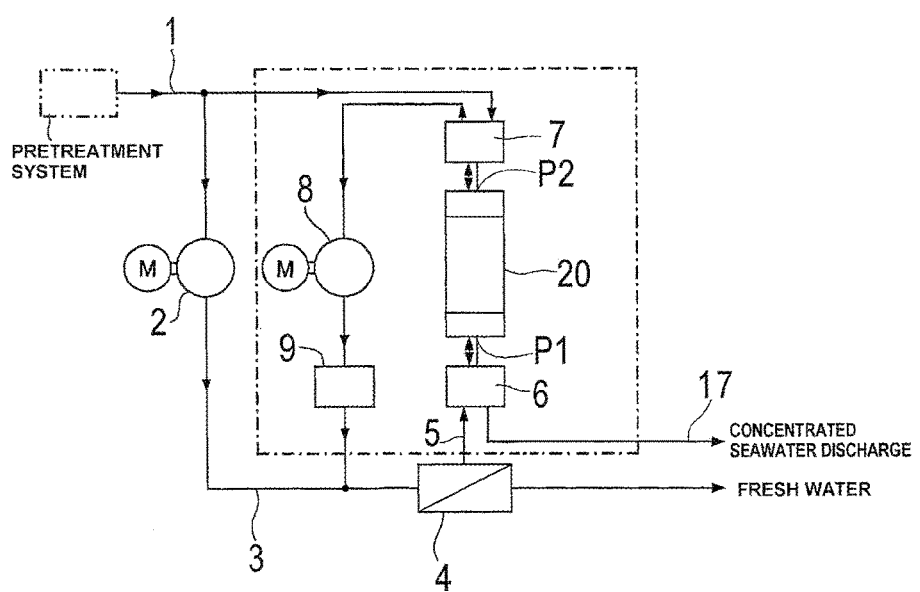
FIG. 1 is a schematic view showing a configuration example of a seawater desalination system according to the present invention.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 20. A seawater supply line 1 for supplying the pretreated seawater having a low pressure is branched at an upstream side of the high-pressure pump 2 and is connected via a valve 7 to a seawater port P2 of the energy recovery chamber 20. The energy recovery chamber 20 performs energy transmission from the concentrated seawater to the seawater while separating two fluids by a boundary region between the concentrated seawater and the seawater.

The seawater pressurized by utilizing a pressure of the concentrated seawater in the energy recovery chamber 20 is supplied via a valve 7 to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4. On the other hand, the concentrated seawater which has pressurized the seawater and lost the energy is discharged from the energy recovery chamber 20 via the control valve 6 to a concentrated seawater discharge line 17.

When the pressure of the discharge line 3 of the high-pressure pump 2 is 6.5 MPA for example, the pressure is slightly lowered by pressure loss of the RO membrane module of the reverse-osmosis membrane-separation apparatus 4, and the concentrated seawater having a pressure of 6.4 MPA is discharged from the reverse-osmosis membrane-separation apparatus 4. When the pressure energy of the concentrated seawater acts on the seawater, the seawater is pressurized to the same pressure (6.4 MPA), but the pressure is decreased by pressure loss of the energy recovery apparatus itself when the seawater flows through the energy recovery apparatus, and the seawater having a pressure of 6.3 MPA for example is discharged from the energy recovery apparatus. The booster pump 8 slightly pressurizes the seawater from 6.3 MPA to 6.5 MPA, and the seawater merges into the discharge line 3 of the high-pressure pump 2 and is supplied to the reverse-osmosis membrane-separation apparatus 4. The booster pump 8 only needs to pressurize the seawater to make up for such a small pressure loss, and thus a small amount of energy is consumed in the booster pump 8.

It is assumed that 100% of an amount of seawater is supplied to the reverse-osmosis membrane-separation apparatus 4, 40% of the amount of the seawater can be changed to fresh water. The remaining 60% of the amount of the seawater is concentrated and discharged from the reverse-osmosis membrane-separation apparatus 4 as concentrated seawater. Then, the pressure of the 60% concentrated seawater is transmitted and recovered by the seawater in the energy recovery apparatus, and the seawater having an increased pressure is discharged from the energy recovery apparatus. Therefore, the seawater having a high pressure equivalent to the seawater pressurized by the high-pressure pump can be obtained, with a small amount of energy consumed by the booster pump. Thus, the energy which is consumed by the high-pressure pump to produce the fresh water can be about half of the energy in the case of no energy recovery apparatus.

Figure 2:
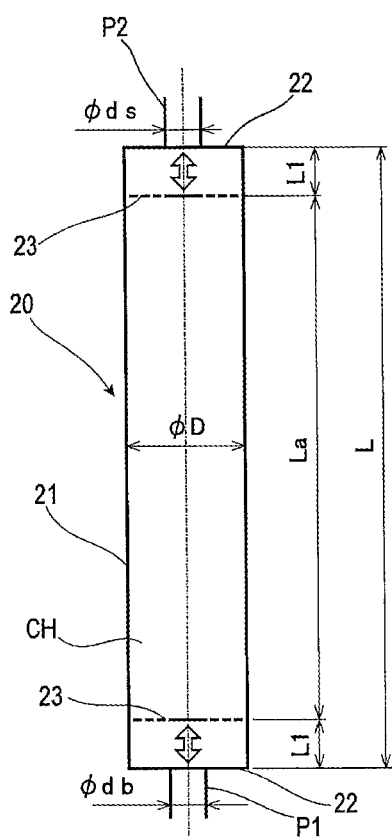
FIG. 2 is a schematic cross-sectional view showing the energy recovery chamber of the present invention which is applied to the seawater desalination system shown in FIG. 1.

FIG. 2 is a schematic cross-sectional view showing the energy recovery chamber of the present invention which is applied to the seawater desalination system shown in FIG. 1. As shown in FIG. 2, the energy recovery chamber 20 comprises a long chamber body 21 having a cylindrical shape, and end plates 22 for closing both opening ends of the chamber body 21. A chamber CH is formed in the chamber body 21, and a concentrated seawater port P1 is formed in one of the end plates 22 and a seawater port P2 is formed in the other of the end plates 22.

The energy recovery chamber 20 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the port P2 for the seawater having small specific gravity is disposed at an upper part of the chamber CH. That is, the long chamber body 21 having a cylindrical shape is installed such that a longitudinal direction (axial direction) of the chamber is placed in a vertical direction. The concentrated seawater port P1 is provided at the lower part of the chamber CH for supplying and discharging the concentrated seawater at the lower part of the chamber CH, and the seawater port P2 is provided at the upper part of the chamber CH for supplying and discharging the seawater at the upper part of the chamber CH. The entire length of the chamber CH is L. In the chamber CH, a flow resistor 23 is disposed at a position spaced by a distance L1 in the axial direction from the concentrated seawater port P1, and a flow resistor 23 is disposed at a position spaced by a distance L1 in the axial direction from the seawater port P2.

Figure 3:
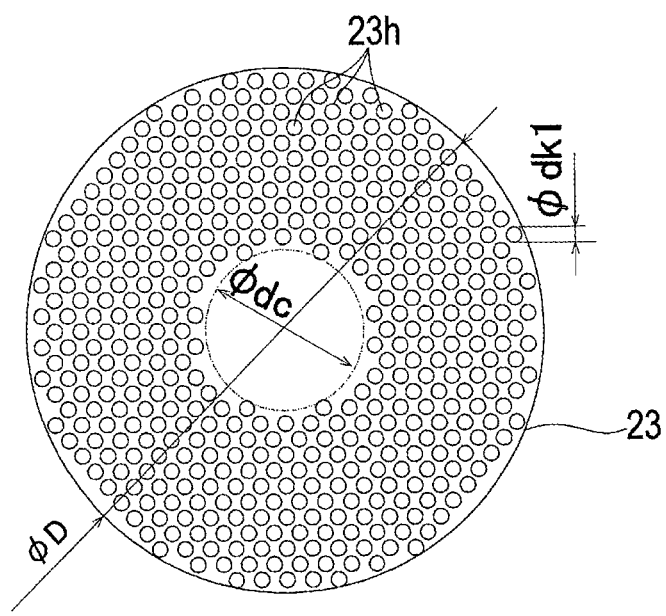
FIG. 3 is a plan view showing an example of the flow resistor.

FIG. 3 is a plan view showing an example of the flow resistor. As shown in FIG. 3, the flow resistor 23 comprises a single perforated plate which has a circular plate shape having an outer diameter ($\phi$D) equal to the inner diameter of the chamber and has a plurality of small holes 23$h$ having a diameter $\phi$dk1 formed outside a hypothetical circle ($\phi$dc) at a central part of the circular plate and no hole inside the hypothetical circle (center side). Specifically, the perforated plate has a central portion which is blocked.

The diameter of the hypothetical circle ($\phi$dc) for blocking the central part of the perforated plate is equal to or slightly larger than the inner diameter $\phi$ds of the seawater port and the inner diameter $\phi$db of the concentrated seawater port shown in FIG. 2. Therefore, the high-speed fluid flowing in through each port collides with the blockage portion and is thus slowed down. However, if the blockage portion is larger than each port excessively, the flow of fluid which passes through the plural small holes 23$h$ provided at the outer circumferential side of the perforated plate is biased toward the outer circumferential side of the perforated plate to lessen the uniformizing action. Therefore, the blockage portion should be within the hypothetical circle which has a diameter nearly equal to the inner diameter of each port.

The flow resistor 23 comprising the perforated plate having a blocked central portion has a function for regulating the flow of fluid so that the flow of fluid at the downstream side of the flow resistor is uniformized over the entirety of the chamber by applying suitable flow resistance to the flow of fluid at the upstream side of the flow resistor in the chamber CH.

Figure 4:
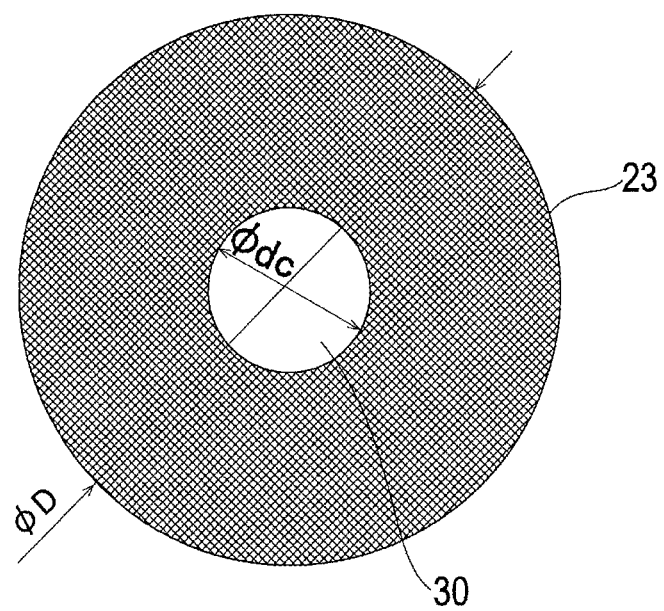
FIG. 4 is a view showing an example of another flow resistor, and a plan view showing the flow resistor comprising a single mesh plate.

FIG. 4 is a view showing an example of another flow resistor, and a plan view showing the flow resistor comprising a single mesh plate. As shown in FIG. 4, the flow resistor 23 comprises a mesh material which is fruited into a circular plate shape having an outer diameter $\phi$D by weaving a wire material. Another circular plate 30 having a small diameter of $\phi$dc is attached to the central portion of the circular plate comprising the mesh material. The fluid passes through a circular ring part comprising the mesh material, and the fluid does not pass through a portion corresponding to the circular plate 30 having a small diameter provided at the central portion of the circular mesh material. That is, the flow resistor 23 is the mesh plate comprising a porous plate whose central portion is blocked.

The flow resistor 23 comprising the porous plate whose central portion is blocked has a function for regulating the flow of fluid so that the flow of fluid at the downstream side of the flow resistor is uniformized over the entirety of the chamber by applying suitable flow resistance to the flow of fluid at the upstream side of the flow resistor in the chamber CH. The perforated plate shown in FIG. 3 and the mesh plate shown in FIG. 4 are generically referred to as a perforated circular plate.

Figure 5:
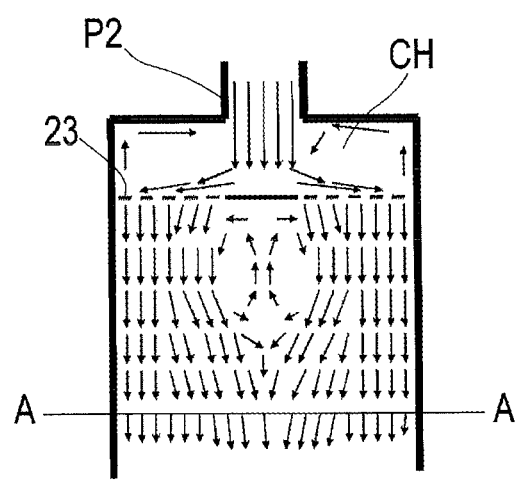
FIG. 5 is a view showing the results of flow analysis in the vicinity of the seawater port in the case where the flow resistor comprising a perforated plate whose central portion is blocked is installed horizontally as shown in FIG. 2.

FIG. 5 is a view showing the results of flow analysis in the vicinity of the seawater port in the case where the flow resistor 23 comprising a perforated plate whose central portion is blocked is installed horizontally as shown in FIG. 2. Arrows in FIG. 5 are as follows: Flow velocity of fluid is shown by a length of arrow and flow direction of fluid is shown by a direction of arrow.

Because the fluid flows into the chamber CH from the seawater port P2 having a small diameter, the fluid near the port of the chamber has a velocity distribution having a large stream at the central part of the chamber. The high-speed flow of fluid at the central part collides with the blockage portion of the perforated plate facing the port, and then the flow of fluid is directed horizontally along the plate toward the outer circumference of the chamber. The fluid passes through the perforated plate only from the small holes formed at the outer circumferential portion of the perforated plate and flows downstream, and part of the horizontal flow of fluid is directed upwardly along the side surface of the chamber, thus generating large vortices at the outer circumferential portion of the chamber. At this time, the flow of fluid collides with the blockage portion of the perforated plate and is then directed toward the outer circumference of the chamber, and the high-speed fluid which flows into the chamber from the port is slowed down. The flow of fluid which has passed through the small holes at the outer circumferential portion of the perforated plate is directed towards the outer circumferential side once at its central part, and then gathers in the central part of the chamber again. Although the vortices generate at the downstream side of the blockage portion of the perforated plate, the velocity of flow and the direction of flow can be uniformized in the A-A cross-section spaced by a predetermined distance from the perforated plate shown in FIG. 5 to the center of the chamber.

Similarly, the fluid which has flowed in from the concentrated seawater port P1 disposed at the lower part of the chamber collides with the blockage portion at the central part of the perforated plate and is thus slowed down, and thus a uniform flow is formed from the small holes at the circumferential portion of the perforated plate over the entire plane of the chamber. Therefore, the fluid between the perforated plates flows in and out in a state of a uniform flow in the horizontal cross-section of the chamber, and thus uniform pushing and pulling of the seawater and the concentrated seawater are performed in the entire cross-section. By this action, when the seawater and the concentrated seawater are pushed and pulled, mixing of the seawater and the concentrated seawater having different salt concentrations can be suppressed.

Here, in the energy recovery apparatus according to the present invention, the pushing and pulling are switched so that the mixing zone of the seawater and the concentrated seawater reciprocates between the flow resistors which are respectively disposed at the seawater port P2 side and the concentrated seawater port P1 side in the chamber. Therefore, the mixing zone of the seawater and the concentrated seawater is present in the portion represented by La between the flow resistors 23, 23 in FIG. 2. The seawater flowing in from the seawater port P2 provided at the upper part of the chamber becomes a uniform flow by the flow resistor 23 in the horizontal cross-section at the downstream side of the flow resistor 23, but this flow is changed also by flow resistance of fluid flowing out from the concentrated seawater port P1 side as a discharge side. Specifically, this flow is changed also by the combination with the flow resistor 23 disposed at the concentrated seawater port side. Therefore, the flow analysis at the time of inflow shown in FIG. 5 takes into account the resistance of the flow resistor 23 at the discharge side.

In this manner, the uniformizing action of flow by the flow resistor at the inflow side in the present invention varies depending on the arrangement of the flow resistor and the port at the discharge side. Because the energy recovery apparatus repeats inflow and discharge of the seawater and the concentrated seawater alternately, in addition to uniformization of flow in one direction, the flow of discharge when the fluid flows in the opposite direction should be considered.

The left-hand view of FIG. 6 is a schematic cross-sectional view showing an energy recovery chamber of the energy recovery apparatus according to another embodiment of the present invention, and the right-hand view of FIG. 6 is a plan view showing the perforated plates. As shown in the right side of FIG. 6, in the chamber, a first perforated plate 24 is provided horizontally at a position spaced by a distance L1 from the seawater port P2, and similarly a first perforated plate 24 is provided horizontally at a position spaced by a distance L1 from the concentrated seawater port P1. Further, second perforated plates 25 are provided horizontally at positions spaced by a distance L2 from the respective first perforated plates 24. The first perforated plate 24 and the second perforated plate 25 constitute a flow resistor 23.

The plan view at the right side of FIG. 6 is a plan view which shows the first perforated plate 24 and the second perforated plate 25 at the seawater port side and the second perforated plate 25 and the first perforated plate 24 at the concentrated seawater port side from the top to the bottom. The first perforated plate 24 constituting the flow resistor disposed in the energy recovery chamber shown in FIG. 6 comprises a perforated plate having a blockage central portion and a plurality of small holes formed at an outer circumferential portion thereof. The first perforated plate 24 has the same structure as that in FIG. 3. The first perforated plate 24 may comprise a porous plate which has a blockage central portion and an outer circumferential portion comprising a mesh material as shown in FIG. 4. Further, the second perforated plate 25 comprises a circular plate having small holes formed at regular intervals over the entire surface thereof. The second perforated plate 25 may comprise a circular plate comprising a mesh material.

FIG. 7 is an enlarged plan view of the second perforated plate 25 shown at the right side of FIG. 6. As shown in FIG. 7, the second perforated plate 25 comprises a circular plate having an outer diameter of $\phi D$ equal to an inner diameter of the chamber, and small holes $25h$ having a diameter $\phi dk2$ are faulted at regular intervals over the entire surface of the circular plate.

FIG. 8 is a view showing the results of flow analysis of the interior of the chamber in the case where the seawater flows into the chamber from the seawater port located in the vicinity of the upper part of the chamber in FIG. 6. Arrows in FIG. 8 are as follows: Flow velocity of fluid is shown by a length of arrow and flow direction of fluid is shown by a direction of arrow.

Since the seawater flows into the chamber CH from the port P2 having a small diameter, the seawater in the vicinity of the port of the chamber CH has a velocity distribution having a large stream at the central part of the chamber, and the action of the first perforated plate 24 or the porous plate is such an action that the flow of fluid is dispersed at the central blockage portion of the first perforated plate 24 toward the outer circumferential portion and the flow of fluid which has passed through the first perforated plate 24 is uniformized. This action is the same as that described in FIG. 5. Further, by providing the second perforated plate 25 at a position spaced by a distance L2 from the first perforated plate 24, the flow of fluid regulated by the first perforated plate 24 passes through the second perforated plate 25 having small holes over the entire surface thereof to allow the flow of fluid at the downstream side of the second perforated plate 25 to be regulated into a more uniform flow. Therefore, the flow of fluid becomes closer to the flow whose velocities and directions are the same in the A-A cross-section spaced by a certain distance from the second perforated plate 25 to the chamber center, thus achieving a uniform flow.

FIG. 9 is a cross-sectional view showing a chamber of the energy recovery apparatus according to still another embodiment of the present invention. The chamber according to the present embodiment has a configuration in which the upper seawater port is divided into two ports comprising a seawater inflow port $P2_{IN}$ and a seawater discharge port $P2_{OUT}$, and the seawater inflow port $P2_{IN}$ and the seawater discharge port $P2_{OUT}$ are arranged at positions spaced radially from the central axis of the chamber. Further, a holed circular plate 31 having a hole at a central part thereof is disposed at a position spaced by a distance Lp from the ports $P2_{IN}$, $P2_{OUT}$. A first perforated plate 24 having a central blockage portion is provided at a position spaced by a distance L1 from the holed circular plate 31, and a second perforated plate 25 having holes formed at regular intervals over the entire surface thereof is provided at a position spaced by a distance L2 from the first perforated plate 24.

FIG. 10 is a plan view of the holed circular plate 31. The holed circular plate 31 has an outer diameter equal to the inner diameter (φD) of the chamber and has a circular hole having a diameter (φdp) at a central part thereof. By providing the holed circular plate 31, the fluid which has flowed in from the port is regulated so that the fluid does not flow through the outer circumferential portion of the holed circular plate 31, but flows through the hole having a diameter φdp at the central part of the holed circular plate 31 toward the flow resistor 23. Therefore, even if the port is not disposed at the central part of the chamber, the flow of fluid can be changed once into the flow through the central part of the chamber, and then this flow can be diffused uniformly in an outer circumferential direction and regulated by the flow resistor 23 at the downstream side. Therefore, a uniform flow is formed in the cylindrical chamber.

FIG. 11 is a view showing the results of flow analysis in the vicinity of the seawater port in the chamber in the case where the seawater flows in from the seawater port provided at the position spaced radially from the central axis of the chamber as shown in FIG. 9. In FIG. 11, the seawater discharge port $P2_{OUT}$ is not shown. Arrows in FIG. 11 are as follows: Flow velocity of fluid is shown by a length of arrow and flow direction of fluid is shown by a direction of arrow.

When the high-speed seawater flows into the chamber CH from the seawater inflow port $P2_{IN}$ disposed at an eccentric position from the chamber axis, the flow of the seawater collides with the plate portion having no hole at the circumferential portion of the holed circular plate 31 and is then dispersed in the space partitioned by the holed circular plate 31 and located at the seawater port side. Then, the seawater passes through the hole formed at the central portion of the holed circular plate 31 and flows at a high speed toward the central portion of the first perforated plate 24. Thereafter, the flow of fluid collides with the blockage portion having no hole at the central portion of the first perforated plate 24, and is then dispersed toward the outer circumference of the chamber and slowed down. The flow of fluid at the downstream side of the first perforated plate 24 is the same as the flow described and shown in FIG. 8.

FIG. 12 is a cross-sectional view of the chamber in the energy recovery apparatus according to still another embodiment of the present invention.

The configuration at the seawater port side of the chamber in FIG. 12 is the same as that in the embodiment shown in FIG. 9. However, the chamber of the present embodiment is different in that the concentrated seawater port at the lower part of the chamber is formed at the side surface of the chamber. Specifically, since the concentrated seawater port P1 is formed at the side surface of the chamber, the concentrated seawater is supplied and discharged in a direction perpendicular to the axial direction of the chamber (radial direction of the chamber). Further, the holed circular plate 31 having a hole formed at the central part thereof is provided at a position spaced by a distance Lp from the chamber end surface at the concentrated seawater port side, and the first perforated plate 24 is provided at a position spaced by a distance L1 from the holed circular plate 31. Furthermore, the second perforated plate 25 is provided at a position spaced by a distance L2 from the first perforated plate 24.

The holed circular plate 31 has the same configuration as that shown in FIG. 10, the first perforated plate 24 has the same configuration as that shown in FIG. 3 or FIG. 4, and the second perforated plate 25 has the same configuration as that shown in FIG. 7.

In FIG. 12, the fluid which has flowed in from the concentrated seawater port P1 at the chamber side surface is regulated so that the fluid flows through the hole having a diameter (φdp) at the central portion of the holed circular plate 31 toward the flow resistor 23. Therefore, even if the port is disposed at the side surface of the chamber, the flow of fluid can be changed once into the flow through the central part of the chamber, and then this flow can be diffused uniformly in an outer circumferential direction and regulated by the flow resistor 23 at the downstream side. Therefore, a uniform flow is formed in the cylindrical chamber.

FIG. 13 is a view showing the results of flow analysis in the vicinity of the concentrated seawater port in the chamber in the case where the concentrated seawater port P1 is provided at the side surface of the chamber as shown in FIG. 12. Arrows in FIG. 13 are as follows: Flow velocity of fluid is shown by a length of arrow and flow direction of fluid is shown by a direction of arrow.

When the high-speed concentrated seawater flows into the chamber CH in a direction perpendicular to the chamber axis from the concentrated seawater port P1 disposed at the side surface of the chamber, in the space partitioned by the holed circular plate 31 and located at the concentrated seawater port side, part of the concentrated seawater flows out through the hole formed at the central portion of the holed circular plate 31, and part of the concentrated seawater forms vortices in the space and spreads in the space. Then, the concentrated seawater flows out through the hole formed at the central portion of the holed circular plate 31. Thereafter, the concentrated seawater flows at a high speed toward the central portion of the first perforated plate 24 from the holed circular plate 31, and the flow of the concentrated seawater collides with the blockage portion having no hole at the central portion of the first perforated plate 24, and is then dispersed toward the outer circumference of the chamber and is slowed down. The flow of fluid at the downstream side after flowing in through the first perforated plate 24 becomes the upside-down flow, which has been described and shown in FIG. 8.

FIG. 14 is a schematic cross-sectional view showing an energy recovery chamber of the energy recovery apparatus according to another embodiment of the present invention. As shown in FIG. 14, in the chamber, a first perforated plate 24 is provided horizontally at a position spaced by a distance L1 from the seawater port P2, and similarly a first perforated plate 24 is provided horizontally at a position spaced by a distance L1 from the concentrated seawater port P1. Further, second perforated plates 25 are provided horizontally at positions spaced by a distance L2 from the respective first perforated plates 24. The first perforated plate 24 and the second perforated plate 25 constitute a flow resistor 23.

The first perforated plate 24 which constitutes the flow resistor 23 disposed in the energy recovery chamber comprises a perforated plate having a central blockage portion and a plurality of small holes at an outer circumferential portion thereof. A conically-shaped corn 26 is formed on the central blockage portion of the perforated plate so as to face the second perforated plate 25.

As the results of the flow analysis shown in FIG. 8, the flow of fluid which has passed through the small holes from the outer circumferential portion of the first perforated plate generates vortices at the downstream side of the blockage portion of the perforated plate. However, by providing the conically-shaped corn 26, the downward flow along the wall surface of the conically-shaped corn 26 can be formed without generating velocities, and thus the flow of fluid from the first perforated plate 24 to the second perforated plate 25 becomes uniform. Then, by the regulating action of the second perforated plate 25, the flow of fluid at the downstream side of the second perforated plate 25 can be further uniformized.

As described above, the uniformizing action of the flow by the flow resistor at the inflow side varies also depending on the arrangement of the flow resistor 23 and the port at the discharge side. By providing the holed circular plate 31 having a hole at the central part thereof, the inflow position of the fluid to the flow resistor 23 becomes a center of the chamber, regardless of the arrangement of the port. As in the embodiments shown in FIG. 9 and FIG. 12, even if the actual seawater port and the concentrated seawater port are not located centrally, the hole formed at the central part of the holed circular plate 31 disposed between each port and the flow resistor 23 can be considered as a hypothetical seawater port or concentrated seawater port in the chamber. Thus, the operation and the effect equivalent to the invention according to the embodiments shown in FIG. 2 and FIG. 6 can be obtained.

In this manner, in order to form a uniform flow in the chamber space (the portion of La in FIGS. 2, 6, 9, 12 and 14) in which the seawater and the concentrated seawater are pushed and pulled, the present invention has a configuration which has the inflow and discharge port (or hole) at the chamber center position, the flow resistor, the chamber space in which the seawater and the concentrated seawater are pushed and pulled, the flow resistor, and the inflow and discharge port (or hole) at the chamber center position. Thus, even if the fluid flows in the opposite direction, the same configuration is formed and the same sequence of flow is formed. In this manner, in the inflow and discharge of the fluid, the flow resistance arranged in the chamber has symmetry.

The flow resistors arranged in the chamber between the ports are rotationally symmetric about a chamber central axis, and the flow resistance of inflow and discharge of fluid in the radial direction of the chamber is arranged to be rotationally symmetric. As in the embodiment in FIG. 9, in the case where one of the ports is not located at the center of the chamber, the internal structure of the chamber between the hole at the central portion of the holed circular plate 31 and the central port is rotationally symmetric about the chamber central axis. As in the embodiment shown in FIG. 12, in the case where both ports are not located at the chamber center, the internal structure of the chamber between the holes at the central portions of both the holed circular plates 31 is rotationally symmetric about the chamber central axis.

When the discharge of the concentrated seawater in the case where the holed circular plate 31 is not provided at the concentrated seawater side in FIG. 12 is considered, the flow of the concentrated seawater is offset in a radial direction because the concentrated seawater is easily discharged from the flow resistor 23 at the concentrated seawater port side to the port P1 side at the left side located downstream of the flow resistor 23. As a result, considering the seawater inflow, the action by the flow resistor 23 at the seawater side is affected by non-uniformity of the flow resistance downstream of the flow resistor 23, and thus the uniformizing action is lost. This is because in the case where the holed circular plate 31 in the embodiment of FIG. 12 is not provided, the rotational symmetry about the chamber central axis in the arrangement between the ports is lost and the characteristic of the structural symmetry of the present invention is lost. Thus, according to the present invention, the action of the flow resistors arranged in the chamber between the ports (holes) is made to be rotationally symmetric about the chamber central axis, and thus the flow resistance in a radial direction of the chamber becomes rotationally symmetric, thus forming a uniform flow in the pushing and pulling space between the flow resistors.

Although certain preferred embodiments of the present invention have been shown and described in detail, it should be understood that various changes and modifications may be made without departing from the scope of the appended claims.

INDUSTRIAL APPLICABILITY

The present invention is applicable to a seawater desalination system for desalinating seawater by removing salinity from the seawater and an energy recovery apparatus which is preferably used in the seawater desalination system.

REFERENCE SIGNS LIST 1 seawater supply line
2 high-pressure pump
3 discharge line
4 reverse-osmosis membrane-separation apparatus
5 concentrated seawater line
6 control valve
7, 9 valve
8 booster pump
10, 20 energy recovery chamber
11 energy recovery apparatus
21 chamber body 12, 22 end plates
13, 23 flow resistor
14, 24 first perforated plate
15, 25 second perforated plate
16 piston
17 concentrated seawater discharge line
23h holes
26 conically-shaped corn
30 circular plate
31 holed circular plate
CH chamber
P1 concentrated seawater port
P2 seawater port
$P2_{IN}$ seawater inflow port
$P2_{OUT}$ seawater discharge port

The invention claimed is:

1. An energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising:
 a cylindrical chamber having a space for containing concentrated seawater and seawater therein, the chamber being installed such that a longitudinal direction of the chamber is placed in a vertical direction;
 a concentrated seawater port provided at a lower part of the chamber for supplying and discharging the concentrated seawater, the concentrated seawater port being positioned on a central axis of the cylindrical chamber;
 a seawater port provided at an upper part of the chamber for supplying and discharging the seawater, the seawater port being positioned on the central axis of the cylindrical chamber;
 a first flow resistor provided at a concentrated seawater port side in the chamber; and
 a second flow resistor provided at a seawater port side in the chamber;
 wherein the first flow resistor provided at the concentrated seawater port side and the second flow resistor provided at the seawater port side each comprise a first perforated circular plate, the first perforated circular plate comprising a central area with a predetermined diameter, and a circumferential area outside the predetermined diameter, the central area having no holes and the circumferential area having holes formed over the circumferential area,
 wherein the predetermined diameter of the central area of the first perforated circular plate for the first flow resistor is substantially equal to an inner diameter of the concentrated seawater port,
 wherein the predetermined diameter of the central area of the first perforated circular plate for the second flow resistor is substantially equal to an inner diameter of the seawater port,
 wherein the first flow resistor and the second flow resistor each comprise a second perforated circular plate having holes that are regularly spaced over an entire surface of the second perforated circular plate,
 the second perforated circular plate of the first flow resistor is placed more distant from the concentrated seawater port than the first perforated circular plate of the first flow resistor, and
 the second perforated circular plate of the second flow resistor is placed more distant from the seawater port than the first perforated circular plate of the second flow resistor.

2. The energy recovery apparatus according to claim 1, wherein the first perforated circular plate for each of the first flow resistor and the second flow resistor comprises a perforated plate or a mesh plate, the mesh plate being formed by weaving a wire material.

3. The energy recovery apparatus according to claim 1, further comprising at least one doughnut-shaped circular plate having an opening at a center thereof, wherein:
 the at least one doughnut-shaped circular plate comprises one doughnut-shaped circular plate provided between the concentrated seawater port and the first flow resistor,
 the at least one doughnut-shaped circular plate comprises one doughnut-shaped circular plate provided between the seawater port and the second flow resistor, or
 the at least one doughnut-shaped circular plate comprises a first doughnut-shaped circular plate provided between the concentrated seawater port and the first flow resistor and a second doughnut-shaped circular plate provided between the seawater port and the second flow resistor.

4. The energy recovery apparatus according to claim 1, wherein:
 the first perforated circular plate for the first flow resistor has a conically-shaped member inside the predetermined diameter of its central area that is tapered toward the second perforated circular plate of the first flow resistor, and
 the first perforated circular plate for the second flow resistor has a conically-shaped member inside the predetermined diameter of its central area that is tapered toward the second perforated circular plate of the second flow resistor.

5. A seawater desalination system for producing fresh water from seawater by supplying the seawater pressurized by a pump to a reverse-osmosis membrane-separation apparatus to separate the seawater into fresh water and concentrated seawater, the seawater desalination system comprising:
 an energy recovery apparatus according to claim 1 for converting pressure energy of the concentrated seawater discharged from the reverse-osmosis membrane-separation apparatus to pressure energy of the seawater.

6. The energy recovery apparatus according to claim 1, wherein the first perforated circular plate for each of the first flow resistor and the second flow resistor consists of the central area and the circumferential area.

* * * * *